(12) United States Patent
Mital et al.

(10) Patent No.: US 9,714,597 B2
(45) Date of Patent: Jul. 25, 2017

(54) EXHAUST MIXER FOR COMPACT SYSTEM

(71) Applicant: GM GLOBAL TECHNOLOGY OPERATIONS LLC, Detroit, MI (US)

(72) Inventors: Rahul Mital, Rochester Hills, MI (US); Anil Yadav, Bangalore (IN); Jianwen Li, West Bloomfield, MI (US); Amit Prabhakar, Bangalore (IN); Claudio Ciaravino, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 68 days.

(21) Appl. No.: 14/958,105

(22) Filed: Dec. 3, 2015

(65) Prior Publication Data

US 2017/0159532 A1 Jun. 8, 2017

(51) Int. Cl.
| | |
|---|---|
| *F01N 1/00* | (2006.01) |
| *F01N 3/28* | (2006.01) |
| *B01D 53/94* | (2006.01) |
| *F01N 3/20* | (2006.01) |
| *B01F 5/06* | (2006.01) |

(52) U.S. Cl.
CPC ....... *F01N 3/2892* (2013.01); *B01D 53/9431* (2013.01); *B01F 5/0608* (2013.01); *F01N 3/2066* (2013.01)

(58) Field of Classification Search
CPC ...... F01N 3/2892; F01N 3/2066; F01N 3/021; F01N 2610/02; F01N 13/0097; F01N 13/082; F01N 2240/20; B01F 5/0616; B01F 5/0608; B01F 5/0617; B01F 5/0451; B01F 3/04049

USPC ........................................................... 60/324
See application file for complete search history.

(56) References Cited

U.S. PATENT DOCUMENTS

| | | | | |
|---|---|---|---|---|
| 4,600,544 A | * | 7/1986 | Mix | B01F 5/0616 202/158 |
| 4,981,368 A | * | 1/1991 | Smith | B01F 5/0473 366/337 |
| 2008/0267780 A1 | * | 10/2008 | Wirth | B01F 3/022 416/204 A |
| 2010/0107617 A1 | * | 5/2010 | Kaiser | B01F 3/04049 60/324 |
| 2011/0174407 A1 | * | 7/2011 | Lundberg | B01F 5/0618 138/37 |
| 2013/0074483 A1 | * | 3/2013 | Leicht | B01F 5/0451 60/317 |

* cited by examiner

*Primary Examiner* — Phutthiwat Wongwian
*Assistant Examiner* — Diem Tran
(74) *Attorney, Agent, or Firm* — Quinn IP Law

(57) ABSTRACT

A mixer includes a plurality of blades extending along a longitudinal axis. The blades are arranged in a single row, and are axially spaced from each other along a transverse axis. Each of the blades defines a window. Each of the blades includes an upstream portion, and a downstream portion. Each of the blades includes a bend at the window that forms an interior blade angle between its respective upstream portion and its respective downstream portion. The single row of the blades is arranged to include a first group of blades and a second group of blades. The interior blade angle of each of the blades in the first group faces in a first axial direction along the transverse axis. The interior blade angle of each of the blades in the second group faces in a second axial direction along the transverse axis.

20 Claims, 3 Drawing Sheets

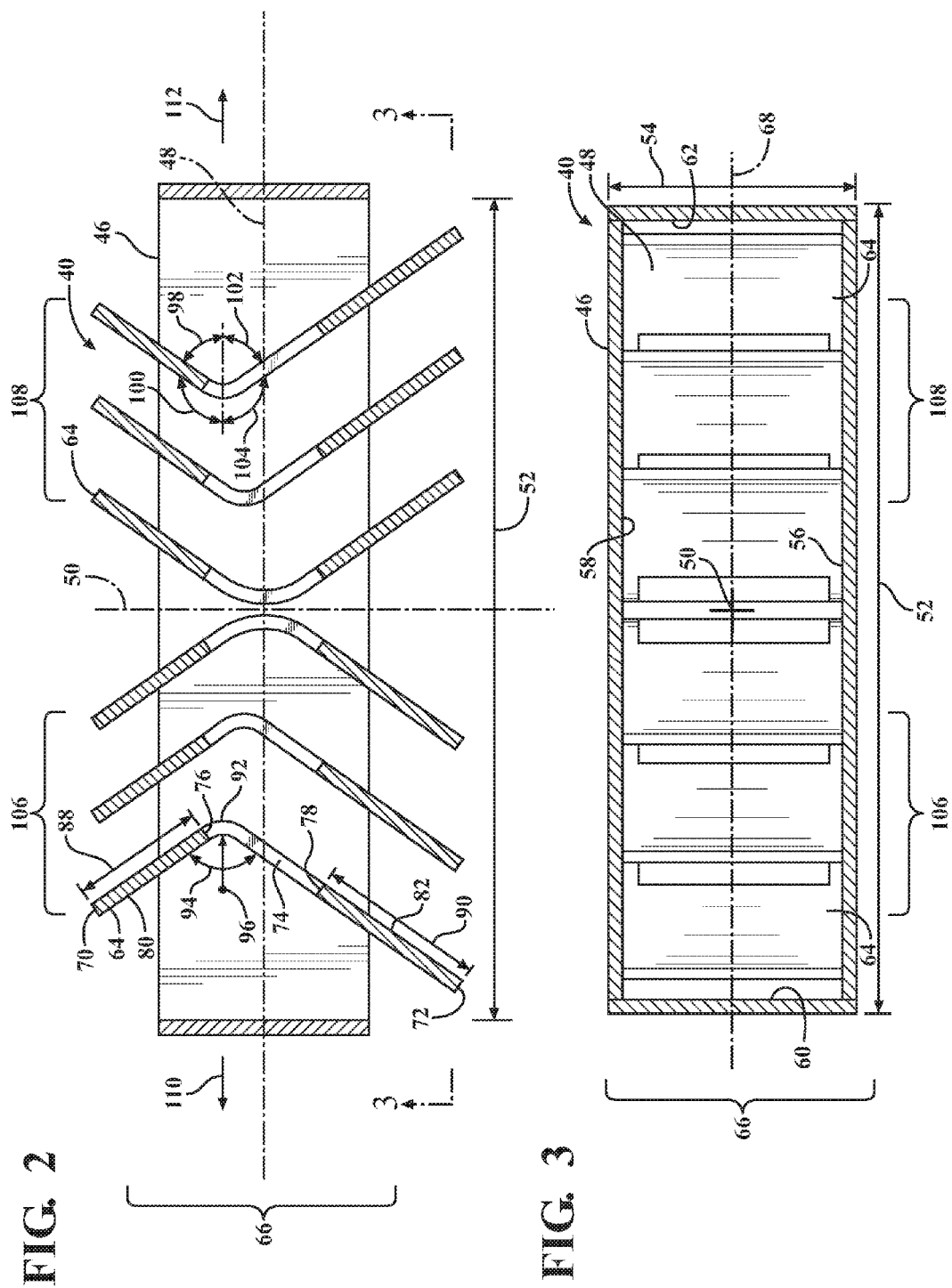

EXHAUST MIXER FOR COMPACT SYSTEM

TECHNICAL FIELD

The disclosure generally relates to a mixer for mixing a reductant into a flow of exhaust gas in an exhaust gas treatment system of a vehicle.

BACKGROUND

Exhaust gas treatment systems, particularly for vehicles having a diesel engine, may include a Selective Catalytic Reduction (SCR) catalytic converter. The SCR catalytic converter reacts with a reductant, which is introduced into a flow of exhaust gas, by an injector disposed upstream of the SCR catalytic converter. The reductant reacts with the nitric oxides in the exhaust gas over a catalyst in the SCR catalytic converter to convert the nitric oxides in the exhaust gas into nitrogen and water. The reductant may include a mixture of urea and water. The exhaust gas treatment system includes a mixer, which is disposed downstream of the reductant injector, and upstream of the SCR catalytic converter. The mixer mixes and/or vaporizes the reductant into the flow of exhaust gas.

SUMMARY

A mixer for an exhaust gas treatment system of a vehicle is provided. The mixer includes a support body. The support body includes a substantially rectangular mixing chamber that defines a fluid flow path disposed along a longitudinal axis. The mixing chamber includes a lower surface, an upper surface spaced from and opposing the lower surface, a first lateral edge surface extending between the lower surface and the upper surface, and a second lateral edge surface extending between the lower surface and the upper surface and opposing the first latera edge surface. A plurality of blades extend between the lower surface and the upper surface of the mixing chamber. The plurality of blades are arranged in a single row, and are axially spaced from each other along a transverse axis that is substantially perpendicular to the longitudinal axis. Each of the plurality of blades extends along the longitudinal axis from an upstream edge to a downstream edge. Each of the plurality of blades defines a window. The window includes an upstream window edge and a downstream window edge spaced from the upstream window edge along the longitudinal axis. Each of the plurality of blades includes an upstream portion that is disposed between its respective upstream edge and its respective upstream window edge, and a downstream portion disposed between its respective downstream window edge and its respective downstream edge. Each of the plurality of blades includes a bend forming an interior blade angle between its respective upstream portion and its respective downstream portion.

A fluid mixer is also provided. The fluid mixer includes a support body having a substantially rectangular mixing chamber, which defines a fluid flow path disposed along a longitudinal axis. The mixing chamber includes a lower surface, an upper surface spaced from and opposing the lower surface, a first lateral edge surface extending between the lower surface and the upper surface, and a second lateral edge surface extending between the lower surface and the upper surface and opposing the first latera edge surface. A plurality of blades extend between the lower surface and the upper surface of the mixing chamber. The plurality of blades are arranged in a single row, and are axially spaced from each other along a transverse axis that is substantially perpendicular to the longitudinal axis. Each of the plurality of blades extends along the longitudinal axis from an upstream edge to a downstream edge. Each of the plurality of blades defines a window having an upstream window edge and a downstream window edge spaced from the upstream window edge along the longitudinal axis. Each of the plurality of blades includes an upstream portion disposed between its respective upstream edge and its respective upstream window edge, and a downstream portion disposed between its respective downstream window edge and its respective downstream edge. Each of the plurality of blades includes an upper bridge portion disposed adjacent the upper surface of the support body, and extending between its respective upstream portion and its respective downstream portion. Each of the plurality of blades includes a lower bridge portion disposed adjacent the lower surface of the support body, and extending between its respective upstream portion and its respective downstream portion. The window is disposed between the upper bridge portion and the lower bridge portion. Each of the plurality of blades includes a bend, defined by its respective upper bridge portion and its respective lower bridge portion. The bend in each of the plurality of blades forms an interior blade angle between its respective upstream portion and its respective downstream portion. The single row of the plurality of blades is arranged to include a first group of blades and a second group of blades. The interior blade angle of each of the plurality of blades in the first group of blades faces in a first axial direction along the transverse axis. The interior blade angle of each of the plurality of blades in the second group of blades faces in a second axial direction along the transverse axis.

Accordingly, the orientation and configuration of the plurality of blades vaporize a reductant and mix the reductant into a flow of exhaust gas, as well as create a swirling flow downstream of the plurality of blades. The mixer provides a short mixing length along the longitudinal axis with a low pressure drop, and is inexpensive to manufacture. The mixer achieves a high reductant evaporation rate into the flow of exhaust gas, which reduces deposits and provides a high Nitric Oxide (NOx) conversion rate.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 2 is a schematic cross sectional view of a mixer of the exhaust gas treatment system, as viewed along a plane parallel with a longitudinal axis and a transverse axis of the mixer.

FIG. 3 is a schematic cross sectional view of the mixer.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims.

Figure 1:
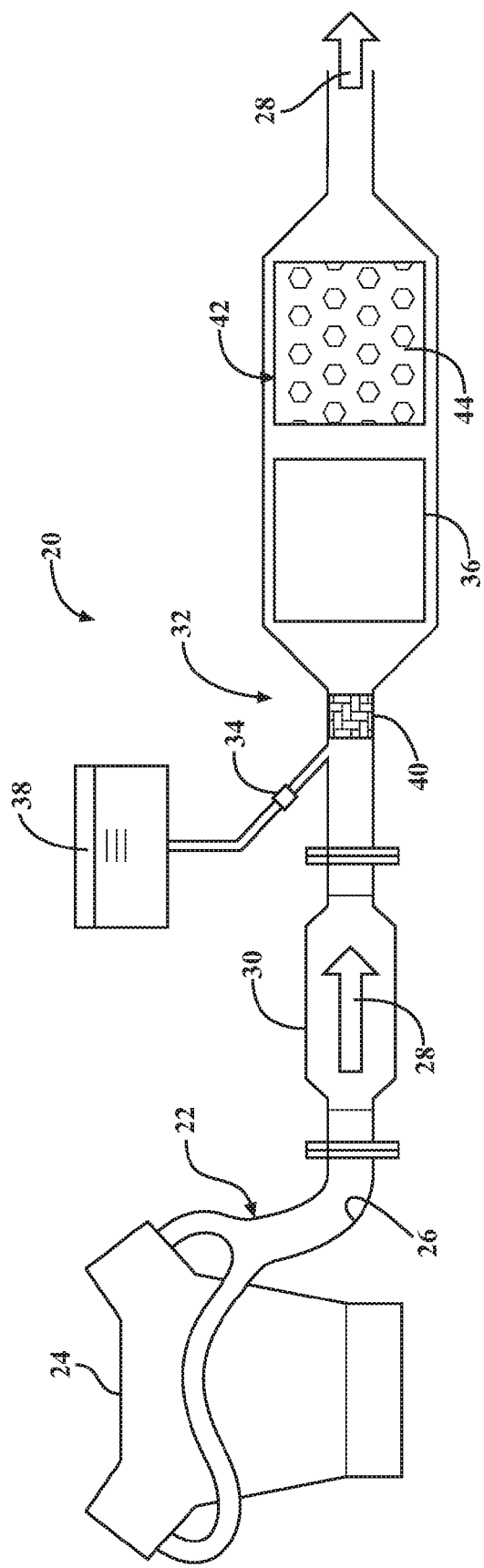
FIG. 1 is a schematic plan view of an engine and an exhaust gas treatment system of a vehicle.

Referring to FIG. 1, wherein like numerals indicate like parts throughout the several views, an exhaust gas treatment system is generally shown at 20. The exhaust gas treatment system 20 includes a flow structure 22 that is coupled to an engine 24 of a vehicle. The engine 24 may include, but is not limited to, a diesel engine 24. Fuel ignites within a plurality of cylinders (not shown) of the engine 24, producing a flow of exhaust gas. The flow structure 22 receives the flow of exhaust gas, and defines a fluid flow path 26 for the flow of exhaust gas. The flow of exhaust gas is directed through the flow structure 22 of the exhaust gas treatment system 20 in a direction indicated by arrow 28. The exhaust gas treatment system 20 treats the exhaust gas to reduce undesirable emissions, and remove particulate matter, i.e., soot, from the exhaust gas.

The exhaust gas treatment system 20 may include an oxidation catalyst 30 disposed in fluid communication with the fluid flow path 26 for receiving the flow of the exhaust gas. The oxidation catalyst 30 includes a flow-through honeycomb structure that is covered with a chemical catalyst. The chemical catalyst may include a precious metal, including but not limited to, platinum or palladium. The chemical catalyst, when heated to a light-off temperature, interacts with and oxidizes reactants in the exhaust gas, such as carbon monoxide and unburned hydrocarbons, thereby reducing undesirable emissions. The oxidation catalyst 30 may include any suitable type of oxidation catalyst 30, and may be sized and or configured in any suitable manner required to meet specific design parameters.

The exhaust gas treatment system 20 may further include a Selective Catalytic Reduction (SCR) system 32. The SCR system 32 is disposed in fluid communication with the fluid flow path 26 for receiving the flow of exhaust gas. The SCR system 32 is disposed downstream of the oxidation catalyst 30. The SCR system 32 includes an injector 34 and a SCR catalytic converter 36. The injector 34 is disposed in fluid communication with the fluid flow path 26 upstream of the SCR catalytic converter 36, and is operable to inject a reductant 38 into the flow of exhaust gas. The reductant 38, may include, but is not limited to a mixture of urea and water. The reductant 38 is often referred to as Diesel Exhaust Fluid (DEF).

The SCR system 32 further includes a mixer 40. The mixer 40 is disposed downstream of the injector 34, and upstream of the SCR catalytic converter 36. The mixer 40 is operable to mix and/or evaporate the reductant 38 into the flow of exhaust gas. When heated by the exhaust gas, the reductant 38 forms ammonia. The SCR catalytic converter 36 includes a chemical catalyst that causes or accelerates a chemical reaction between the ammonia created by the reductant 38 and the NOx (nitrogen oxides) in the exhaust gas to form nitrogen and water vapor.

The exhaust gas treatment system 20 may further include a particulate filter 42. The particulate filter 42 filters particulate matter, i.e., soot, from the exhaust gas of the engine 24. The particulate filter 42 may include one or more substrates 44 that define a plurality of apertures, through which the exhaust gas must flow. The particulate matter collects on the substrates 44 as the exhaust gas flows through the apertures. The particulate filter 42 is occasionally regenerated to remove the collected particulate matter. Regeneration of the particulate filter 42 includes heating the particulate filter 42 to a temperature sufficient to burn the collected particulate matter to carbon dioxide.

Referring to FIGS. 2 and 3, the mixer 40 includes a support body 46. The support body 46 may be directly defined by the flow structure 22 of the exhaust gas treatment system 20, or may be a separate manufacture that is disposed within and/or otherwise attached to the flow structure 22. The support body 46 defines a mixing chamber 48. The mixing chamber 48 is disposed in and/or forms part of the fluid flow path 26 for the flow of exhaust gas. The mixing chamber 48 extends along a longitudinal axis 50, which is generally parallel with the fluid flow path 26 through the mixing chamber 48. Referring to FIG. 3, the mixing chamber 48 includes a cross section perpendicular to the longitudinal axis 50 that is substantially rectangular in shape, in which a width 52 of the cross section of the mixing chamber 48 is generally larger than a height 54 of the cross section of the mixing chamber 48. The mixing chamber 48 includes a lower surface 56 and an upper surface 58 spaced from and opposing the lower surface 56. The mixing chamber 48 further includes a first lateral edge surface 60 that extends between the lower surface 56 and the upper surface 58, and a second lateral edge surface 62 that extends between the lower surface 56 and the upper surface 58. The second lateral edge surface 62 opposes the first lateral edge surface 60.

Referring to FIGS. 2 and 3, the mixer 40 includes a plurality of blades 64. The plurality of blades 64 is arranged in a single row 66. As shown in FIG. 3, each of the blades 64 extend between the lower surface 56 and the upper surface 58 of the mixing chamber 48. As best shown in FIG. 2, the single row 66 of the blades 64 is disposed or extends along a transverse axis 68. The blades 64 are axially spaced from each other along the transverse axis 68. The transverse axis 68 is substantially perpendicular to the longitudinal axis 50, such that the transverse axis 68 and the longitudinal axis 50 form a plane substantially parallel with either the upper surface 58 and/or the lower surface 56 of the mixing chamber 48.

Figure 4:
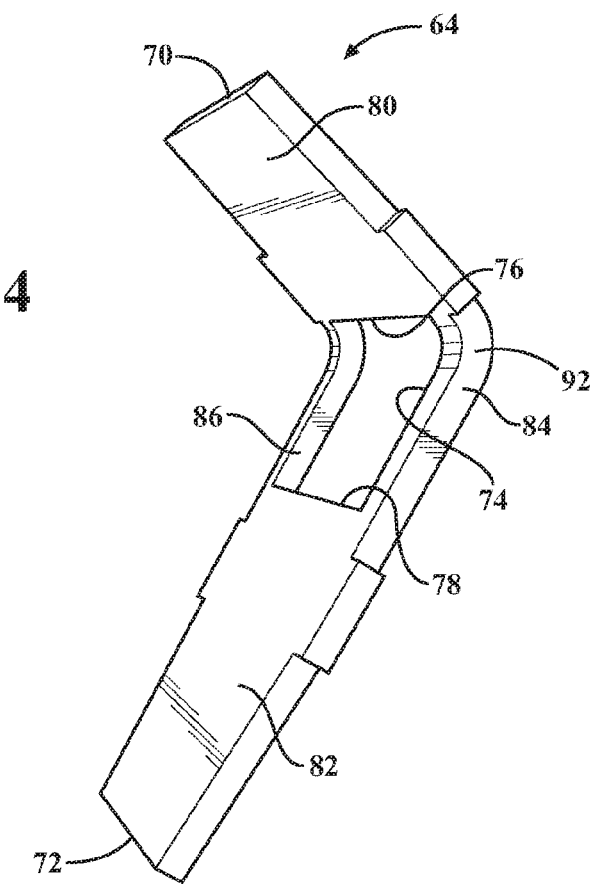
FIG. 4 is a schematic perspective view of a blade of the mixer.
Figure 5:
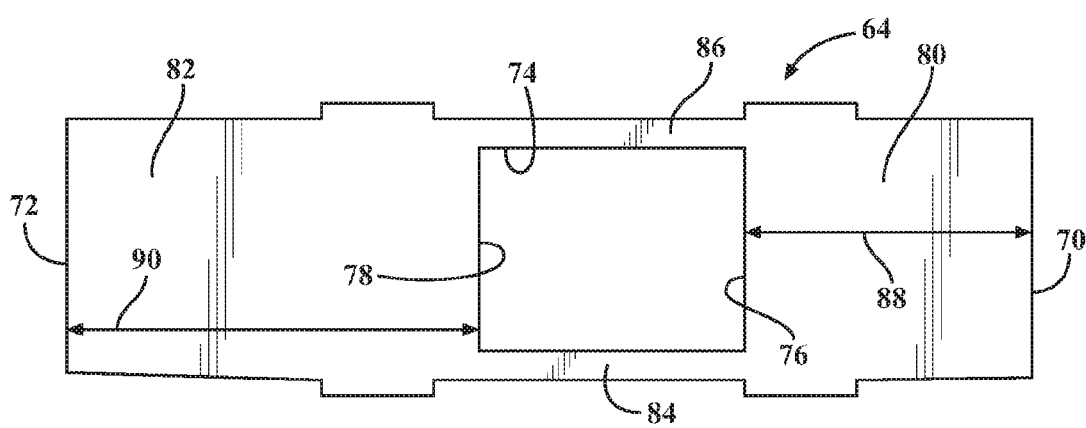
FIG. 5 is a schematic plan view of the blade flattened out onto a plane.

Referring to FIGS. 4 and 5, each of the blades 64 extends along the longitudinal axis 50 between an upstream edge 70 and a downstream edge 72. Each of the blades 64 defines a window 74. As best shown in FIG. 5, in which one of the blades 64 is shown flattened out onto a plan, the window 74 of each respective blade 64 includes an upstream window edge 76, and a downstream window edge 78. The downstream window edge 78 is spaced from the upstream window edge 76 along the longitudinal axis 50. Each of the plurality of blades 64 includes an upstream portion 80 and a downstream portion 82. The upstream portion 80 of each respective blade 64 is disposed between its respective upstream edge 70 and its respective upstream window edge 76. The downstream portion 82 of each respective blade 64 is disposed between its respective downstream window edge 78 and its respective downstream edge 72.

Referring to FIGS. 4 and 5, each of the blades 64 includes an upper bridge portion 84 and a lower bridge portion 86. The upper bridge portion 84 of each respective blade 64 is disposed adjacent the upper surface 58 of the support body 46, and extends between its respective upstream portion 80 and its respective downstream portion 82. The lower bridge portion 86 of each respective blade 64 is disposed adjacent the lower surface 56 of the support body 46, and extends between its respective upstream portion 80 and its respective downstream portion 82. Accordingly, as best shown in FIG. 5, the window 74 is bounded and defined by the upper bridge portion 84 on a first side, and the lower bridge portion 86 on a second side, the upstream portion 80 on a third side, and the downstream portion 82 on a fourth side.

Referring to FIG. 5, the upstream portion 80 of each of the plurality of blades 64 defines an upstream length 88. The upstream length 88 of each respective blade 64 is measured between its respective upstream edge 70 and its respective upstream window edge 76. The downstream portion 82 of each of the blades 64 defines a downstream length 90. The downstream length 90 of each respective blade 64 is measured between its respective downstream window edge 78 and its respective downstream edge 72. In the exemplary embodiment shown in the Figures and described herein, the upstream length 88 is less than the downstream length 90. However, it should be appreciated that this configuration may be reversed, with the downstream length 90 being greater than the upstream length 88.

Referring to FIGS. 2 and 4, each of the blades 64 includes a bend 92, which forms an interior blade angle 94 between its respective upstream portion 80 and its respective downstream portion 82. In the exemplary embodiment shown in the Figures and described herein, the upper bridge portion 84 and the lower bridge portion 86 of each of the blades 64 defines its respective bend 92. However, it should be appreciated that the bend 92 may alternatively be defined by either the upstream portion 80 or the downstream portion 82 of each respective blade 64.

Referring to FIG. 2, the bend 92 in each of the blades 64 defines a circular arc having a radius 96. Preferably, the radius 96 of the circular arc of each respective blade 64 is between the range of 3.0 mm and 11.0 mm. More preferably, the radius 96 of the bend 92 in each of the blades 64 is approximately equal to 7.25 mm.

Referring to FIG. 2, the interior blade angle 94 of each of the blades 64 is preferably between the range of 90° and 130°. More preferably, the interior blade angle 94 of each of the blades 64 is approximately equal to 110°. However, it should be appreciated that the interior angle of each of the respective blades 64 may differ from the exemplary values noted herein.

Referring to FIG. 2, the upstream portion 80 of each of the blades 64 projects to an intersection with the transverse axis 68 to form an upstream interior angle 98 and a complimentary upstream exterior angle 100, relative to the transverse axis 68. The upstream interior angle 98 is an acute angle, whereas the upstream exterior angle 100 is an obtuse angle. Preferably, the upstream interior angle 98 of each respective blade 64 is between the range of 45° and 65°. More preferably, the upstream interior angle 98 of each of the blades 64 is approximately equal to 55°. However, it should be appreciated that the upstream interior angle 98 of each of the respective blades 64 may differ from the exemplary values noted herein.

Referring to FIG. 2, the downstream portion 82 of each of the blades 64 projects to an intersection with the transverse axis 68 to form a downstream interior angle 102 and a complimentary downstream exterior angle 104, relative to the transverse axis 68. The downstream interior angle 102 is an acute angle, whereas the downstream exterior angle 104 is an obtuse angle. Preferably, the downstream interior angle 102 of each of the blades 64 is between the range of 45° and 65°. More preferably, the downstream interior angle 102 of the blades 64 is approximately equal to 55°. However, it should be appreciated that the downstream interior angle 102 of each of the respective blades 64 may differ from the exemplary values noted herein. In the exemplary embodiment of the mixer 40 shown in the Figures and described herein, the upstream interior angle 98 and the downstream interior angle 102 are equal to each other. However, it should be appreciated that the upstream interior angle 98 and the downstream interior angle 102 may differ from each other.

Referring to FIGS. 2 and 4, the window 74 defines an area between the upstream window edge 76, the downstream window edge 78, an upper window 74 edge defined by the upper bridge portion 84, and a lower window 74 edge defined by the lower bridge portion 86. In the exemplary embodiment shown in the Figures and described herein, a larger percentage of the area of the window 74 of each respective blade 64 is disposed between its respective bend 92 and its respective downstream window edge 78, than is disposed between its respective upstream window 74 wedge and its respective bend 92. Accordingly, more of the window 74 is disposed downstream of the bend 92 than is disposed upstream of the bend 92.

As noted above, the blades 64 are arranged in the single row 66 that extends between the first lateral edge surface 60 and the second lateral edge surface 62. Within the single row 66, each of the blades 64 are axially spaced from each other along the transverse axis 68. Referring to FIG. 2, the single row 66 of the blades 64 is arranged to include a first group 106 of blades 64 and a second group 108 of blades 64. The first group 106 of blades 64 and the second group 108 of blades 64 are arranged to mirror each other, across the longitudinal axis 50. Accordingly, the blades 64 in the first group 106 of blades 64 are positioned so that the bend 92 in each respective blade 64 opens up in a first axial direction 110 along the transverse axis 68, and the blades 64 in the second group 108 of blades 64 are positioned so that the bend 92 in each respective blade 64 opens up in a second axial direction 112 along the transverse axis 68. Accordingly, the interior blade angle 94 of each of the blades 64 in the first group 106 of blades 64 faces the first axial direction 110 along the transverse axis 68, and the interior blade angle 94 of each of the blades 64 in the second group 108 of blades 64 faces the second axial direction 112 along the transverse axis 68.

Preferably, and as shown in the Figures, a quantity of the blades 64 disposed in the first group 106 of blades 64 is equal to a quantity of the blades 64 disposed in the second group 108 of blades 64. However, it should be appreciated that the quantity of the blades 64 in the first group 106 of blades 64 may differ from the quantity of the blades 64 in the second group 108 of blades 64. As shown in the Figures, the first group 106 of blades 64 includes three blades 64, and the second group 108 of blades 64 includes three blades 64. However, it should be appreciated that the number or quantity of blades 64 in each of the first group 106 of blades 64 and the second group 108 of blades 64 may differ from the exemplary number shown in the Figures and described herein. Accordingly, the first group 106 of the blades 64 and the second group 108 of the blades 64 may each include more than or less than the three blades 64 shown in each.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A mixer for an exhaust gas treatment system of a vehicle, the mixer comprising:
   a support body located in the exhaust gas treatment system and defining a rectangular mixing chamber defining a fluid flow path disposed along a longitudinal axis, wherein the mixing chamber includes a lower surface, an upper surface spaced from and opposing the lower surface, a first lateral edge surface extending between the lower surface and the upper surface, and a second lateral edge surface extending between the lower surface and the upper surface and opposing the first lateral edge surface;

a plurality of blades extending between the lower surface and the upper surface of the mixing chamber, and arranged in a single row axially spaced from each other along a transverse axis that is perpendicular to the longitudinal axis;

wherein each of the plurality of blades extends along the longitudinal axis from an upstream edge to a downstream edge;

wherein each of the plurality of blades defines a window having an upstream window edge and a downstream window edge spaced from the upstream window edge along the longitudinal axis, such that each of the plurality of blades includes an upstream portion disposed between its respective upstream edge and its respective upstream window edge, and a downstream portion disposed between its respective downstream window edge and its respective downstream edge; and wherein each of the plurality of blades includes a bend forming an interior blade angle between its respective upstream portion and its respective downstream portion.

2. The mixer set forth in claim 1 wherein the interior blade angle of each of the plurality of blades is between approximately 90° and 130°.

3. The mixer set forth in claim 2 wherein the interior blade angle of each of the plurality of blades is approximately equal to 110°.

4. The mixer set forth in claim 1 wherein the upstream portion of each of the plurality of blades projects to form an upstream interior angle and a complimentary upstream exterior angle relative to the transverse axis, and wherein the upstream interior angle is an acute angle between approximately 45° and 65°.

5. The mixer set forth in claim 4 wherein the upstream interior angle of each of the plurality of blades is approximately equal to 55°.

6. The mixer set forth in claim 4 wherein the downstream portion of each of the plurality of blades projects to form a downstream interior angle and a complimentary downstream exterior angle relative to the transverse axis, and wherein the downstream interior angle is an acute angle between approximately 45° and 65°.

7. The mixer set forth in claim 6 wherein the downstream interior angle of each of the plurality of blades is approximately equal to 55°.

8. The mixer set forth in claim 6 wherein the upstream interior angle and the downstream interior angle are equal to each other.

9. The mixer set forth in claim 1 wherein the upstream portion of each of the plurality of blades defines an upstream length measured between its respective upstream edge and its respective upstream window edge, wherein the downstream portion of each of the plurality of blades defines a downstream length measured between its respective downstream window edge and its respective downstream edge, and wherein the upstream length is less than the downstream length.

10. The mixer set forth in claim 1 wherein the bend in each of the plurality of blades defines a circular arc having a radius between approximately 3.0 mm and 11.0 mm.

11. The mixer set forth in claim 10 wherein the radius of the bend in each of the plurality of blades is approximately equal to 7.25 mm.

12. The mixer set forth in claim 1 wherein each of the plurality of blades includes an upper bridge portion disposed adjacent the upper surface of the support body, and extending between its respective upstream portion and its respective downstream portion.

13. The mixer set forth in claim 12 wherein each of the plurality of blades includes a lower bridge portion disposed adjacent the lower surface of the support body, and extending between its respective upstream portion and its respective downstream portion.

14. The mixer set forth in claim 13 wherein the upper bridge portion and the lower bridge portion of each of the plurality of blades defines its respective bend.

15. The mixer set forth in claim 14 wherein a larger percentage of an area of the window of each respective blade of the plurality of blades is disposed between its respective bend and its respective downstream window edge, than is disposed between its respective upstream window wedge and its respective bend.

16. The mixer set forth in claim 1 wherein the single row of the plurality of blades are arranged to include a first group of blades and a second group of blades, with the interior blade angle of each of the plurality of blades in the first group of blades facing a first axial direction along the transverse axis, and the interior blade angle of each of the plurality of blades in the second group of blades facing a second axial direction along the transverse axis.

17. The mixer set forth in claim 16 wherein a quantity of the plurality of blades disposed in the first group of blades is equal to a quantity of the plurality of blades disposed in the second group of blades.

18. A fluid mixer for an exhaust gas treatment system of a vehicle comprising:

a support body located in the exhaust gas treatment system and defining a rectangular mixing cha for an exhaust gas treatment system defining a fluid flow path disposed along a longitudinal axis, wherein the mixing chamber includes a lower surface, an upper surface spaced from and opposing the lower surface, a first lateral edge surface extending between the lower surface and the upper surface, and a second lateral edge surface extending between the lower surface and the upper surface and opposing the first lateral edge surface;

a plurality of blades extending between the lower surface and the upper surface of the mixing chamber, and arranged in a single row axially spaced from each other along a transverse axis that is perpendicular to the longitudinal axis;

wherein each of the plurality of blades extends along the longitudinal axis from an upstream edge to a downstream edge;

wherein each of the plurality of blades defines a window having an upstream window edge and a downstream window edge spaced from the upstream window edge along the longitudinal axis, such that each of the plurality of blades includes an upstream portion disposed between its respective upstream edge and its respective upstream window edge, and a downstream portion disposed between its respective downstream window edge and its respective downstream edge;

wherein each of the plurality of blades includes an upper bridge portion disposed adjacent the upper surface of the support body, and extending between its respective upstream portion and its respective downstream portion;

wherein each of the plurality of blades includes a lower bridge portion disposed adjacent the lower surface of the support body, and extending between its respective upstream portion and its respective downstream portion, with the window disposed between the upper bridge portion and the lower bridge portion wherein each of the plurality of blades includes a bend, defined by its respective upper bridge portion and its respective lower bridge portion, forming an interior blade angle between its respective upstream portion and its respective downstream portion; and wherein the single row of the plurality of blades is arranged to include a first group of blades and a second group of blades, with the interior blade angle of each of the plurality of blades in the first group of blades facing a first axial direction along the transverse axis, and the interior blade angle of each of the plurality of blades in the second group of blades facing a second axial direction along the transverse axis.

19. The fluid mixer set forth in claim 18 wherein:

the upstream portion of each of the plurality of blades projects to form an upstream interior angle and a complimentary upstream exterior angle relative to the transverse axis, with the upstream interior angle being an acute angle approximately equal to 55°; and the downstream portion of each of the plurality of blades projects to form a downstream interior angle and a complimentary downstream exterior angle relative to the transverse axis, with the downstream interior angle being an acute approximately equal to 55°.

20. The fluid mixer set forth in claim 19 wherein:

a larger percentage of an area of the window of each respective blade of the plurality of blades is disposed between its respective bend and its respective downstream window edge, than is disposed between its respective upstream window wedge and its respective bend;

the upstream portion of each of the plurality of blades defines an upstream length measured between its respective upstream edge and its respective upstream window edge;

the downstream portion of each of the plurality of blades defines a downstream length measured between its respective downstream window edge and its respective downstream edge; and the upstream length is less than the downstream length.

* * * * *